(12) United States Patent
Riesebosch

(10) Patent No.: US 8,858,051 B2
(45) Date of Patent: Oct. 14, 2014

(54) LED TRACK LIGHTING HAVING AN ILLUMINATED TRACK

(75) Inventor: Scott A. Riesebosch, St. Catharines (CA)

(73) Assignee: CRS Electronics, Ontario (CA)

( * ) Notice: Subject to any disclaimer, the term of this patent is extended or adjusted under 35 U.S.C. 154(b) by 428 days.

(21) Appl. No.: 13/232,070

(22) Filed: Sep. 14, 2011

(65) Prior Publication Data

US 2013/0063963 A1   Mar. 14, 2013

(51) Int. Cl.
```
F21V 8/00      (2006.01)
F21V 19/02     (2006.01)
F21V 21/34     (2006.01)
F21Y 101/02    (2006.01)
```
(52) U.S. Cl.
CPC .............. *G02B 6/0008* (2013.01); *F21V 21/34* (2013.01); *F21Y 2101/02* (2013.01); *G02B 6/001* (2013.01)

USPC ........... 362/555; 362/404; 362/285; 362/235; 362/223; 362/231

(58) Field of Classification Search
None
See application file for complete search history.

(56) References Cited

U.S. PATENT DOCUMENTS

```
8,602,586  B1 * 12/2013  Dau et al. ............... 362/217.05
2005/0243549 A1 * 11/2005  Ruston ........................ 362/233
2009/0279298 A1 * 11/2009  Mier-Langner et al. ...... 362/235
2009/0310362 A1 * 12/2009  Weij ...................... 362/249.02
2012/0044691 A1 *  2/2012  Covaro ................... 362/249.07
```

* cited by examiner

*Primary Examiner* — Ashok Patel
(74) *Attorney, Agent, or Firm* — Bingham McCutchen LLP

(57) ABSTRACT

An LED track-lighting system includes an LED for emitting light. A light-transmitting element captures light emitted by the LED light and emits it over at least a portion of the track.

13 Claims, 5 Drawing Sheets

LED TRACK LIGHTING HAVING AN ILLUMINATED TRACK

TECHNICAL FIELD

Embodiments of the invention generally relate to LED lights and, more particularly, to LED track-lighting systems.

BACKGROUND

A track-lighting system is a type of lighting unit that includes a structural support element, or lighting track, that may be attached to a ceiling, wall, or other structure. The track may be elongate; i.e., its extent in one dimension may be much greater than in the other two. For example, the track may be two inches wide, three inches deep, and between two and ten feet long. The track may be straight, curved, or have some other shape, may be flexible or rigid, and its surface may have a variety of colors and textures. One or more track lights are attached to the track via one or more track heads. The track lights may be pivoted on horizontal and/or vertical axes, and their position on the track may be adjusted, so that they may better illuminate a room or object. The track lights attach to the track heads, and they to the track, both mechanically and electrically so that power may be transmitted to lamps in the track light.

Thus, tracks may provide structural support for mounting to the ceiling/wall, structural support for mounting the track heads/track lights, and a conduit for transporting power from a power source to the track heads/lights. Conventional track-light systems, however, provide highly directed light via their lighting heads only. There is generally no provision for decorative or other forms of light emission.

SUMMARY

In general, various aspects of the systems and methods described herein include a track-lighting system having an illuminated track. One or more LEDs may be distributed in or on the track; the LEDs may be controlled by one or more control circuits. Light guides may be disposed in or on the track and coupled to the LEDs. The light guides distribute the light from the LEDs to other points on the track, and may emit some or all of the light as they distribute it. Thus, a track-lighting in accordance with the present invention emits light not only with its track lights, but also at one or more points along the track itself.

In one aspect, a track lighting system includes a lighting track for adjustably receiving a track head (providing direct illumination and) an LED light source. A light-transmitting element is associated with the lighting track; the light-transmitting element captures light emitted by the LED light source and emits it over at least a portion of the track.

The light-transmitting element may be a light pipe and may be disposed above, below, beside, or within the track (and/or enclose the track). A track head may be configured to attach to the lighting track, and the LED light source may be disposed within the track head or within the lighting track. The LED light source may provide the direct illumination as well as the light captured by the light-transmitting element or separate LED light sources, disposed within the track head, may provide the direct illumination and the light captured by the light-transmitting element. The LED light source may include a colored LED. A control circuit may change a property (e.g., color, color temperature, or intensity) of the LED light source; the control circuit may be controllable via a wireless, infrared, or wired connection.

In another aspect, a method for illuminating track lighting includes positioning, along an elongate lighting track, at least one track head for direct illumination. Light is caused to be propagated along a light guide associated with the lighting track, and emission of the propagating light is caused at selected locations along the lighting track but not at other locations.

The light propagating along the light guide may be provided by an LED, and direct illumination may be emitted from the at least one track head. The color, intensity, and/or warmth of the LED may be varied. Power may be distributed (by, e.g., wireless coupling) to the track light. The propagated light may be generated at the track head and/or by a light-transmitting element disposed above, below, beside, or within the track.

In another aspect, a track lighting system includes a track head configured to provide direct illumination and containing at least one LED light source. A lighting track, configured to be mountable to a wall or ceiling, adjustably receives the track head and thereby provides structural support thereto. The lighting track accepts power from an external power source and delivers power to the track head. At least LED light source different from the at least one LED light source is contained in the track head and is configured to provide secondary illumination to all or a portion of the lighting track.

In yet another aspect, a track lighting system includes a track head configured to provide direct illumination and containing at least one LED light source. A lighting track, configured to be mountable to a wall or ceiling, adjustably receives the track head and thereby provides structural support thereto. The lighting track accepts power from an external power source and delivers power to the track head. At least one optical light guide is contained in the track head and is configured to inject at least a portion of the light generated by the at least one LED light source in the track head into the lighting track, thereby providing secondary illumination to all or a portion of the lighting track.

In any of the above aspects, light emitted from the LED light source different from the at least one LED light source contained in the track head may be a different color, color temperature, or spectral-power distribution than the light emitted from the at least one LED light source contained in the track head. At least a portion of the track may act as a heatsink to assist in cooling at least one of the LED light sources. The external power source may be AC line voltage, an output of a lighting dimmer, a constant DC power supply, a user-controlled DC power supply, a solar panel, or a battery-backup power source.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. In the following description, various embodiments of the present invention are described with reference to the following drawings, in which.

DETAILED DESCRIPTION

Figure 1:
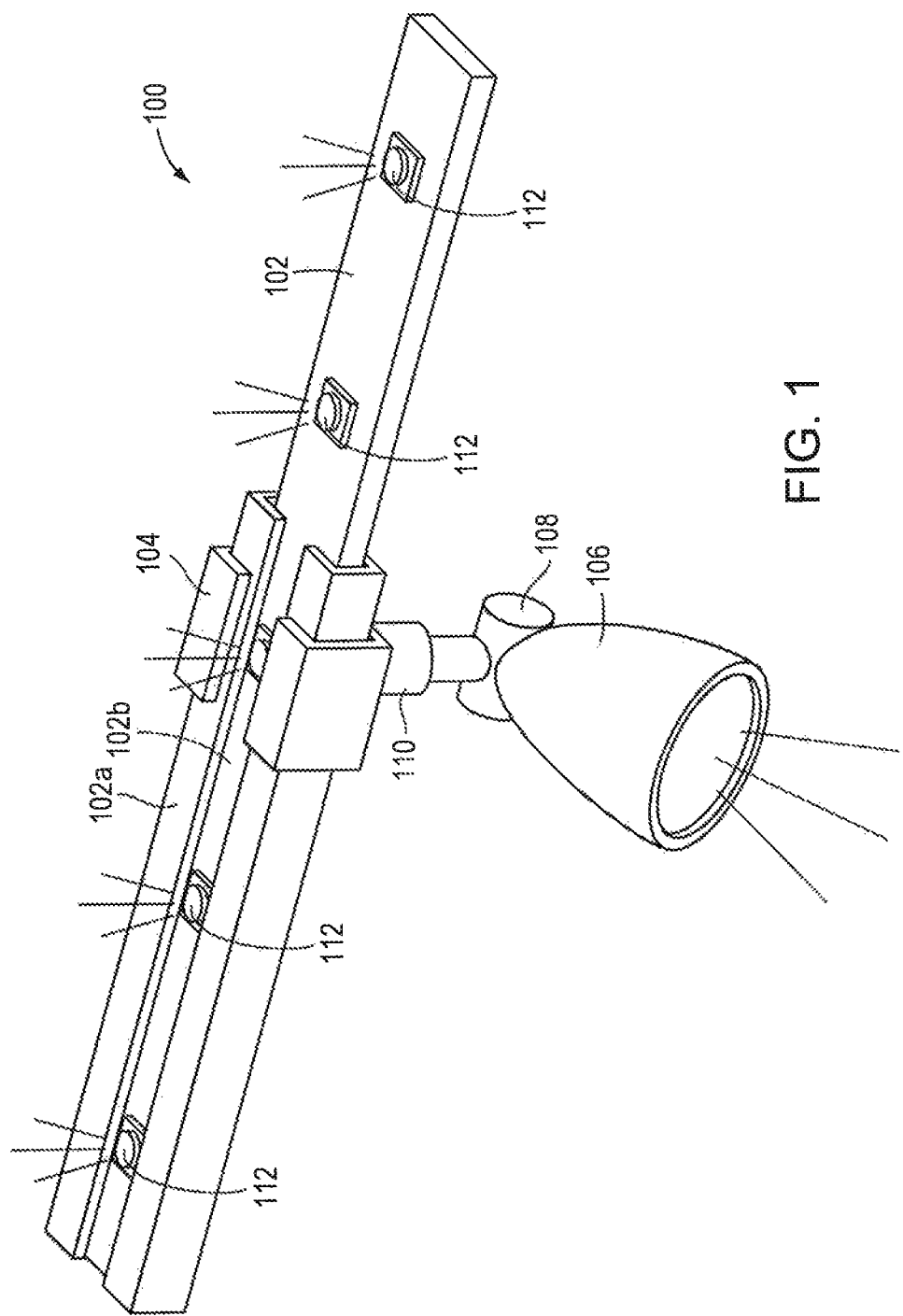
FIG. 1 is a perspective view of a track-lighting system in accordance with an embodiment of the invention.

Described herein are various embodiments of methods and systems relating to track lighting with illuminated tracks. FIG. 1 illustrates a track-lighting system 100 that includes a lighting track 102, a track head 104, and a track light 106. The track light 106 includes one or more LED lamps; power is provided to the lamps by an electrical connection running through the track 102 and the track head 104. The power source may be AC line voltage, an output of a lighting dimmer, a constant DC power supply, a user-controlled DC power supply, a solar panel, and/or a battery-backup power source. The lighting track 102 has a guide 102a and a rail 102b slidably received therein. The guide 102a can be moved slidably along the rail 102b; the track head 104 can be moved slidably along the guide 102a and releasably secured in a desired position. The track light 106 has a first pivot mechanism 108 and a second pivot mechanism 110, permitting two degrees of rotational freedom so that the light 106 may be aimed. Any track light system, however, as known to those of skill in the art, is within the scope of the current invention, and may include features different from those depicted in FIG. 1. For example, the track 102 may be curved, straight, screwed to the ceiling, or otherwise suspended.

The track 102—specifically, in the illustrated embodiment, the rail 102b—is illuminated at a plurality of points 112 along its length. As described in greater detail below, an LED light source within the track 102 or track head 104 provides light, and a light guide transports the light within the track 102. The light may be emitted from the points 112. A single light source may be used to illuminate each of the points 112; in other embodiments, multiple light sources may be used. In one embodiment, each point 112 is illuminated by its own light source. Power may be delivered to these light sources through the guide 102a via contacts in the rail 102. Some or all of the track 102 may act as a heatsink to assist in cooling one or more of the LED light sources.

Figure 2:
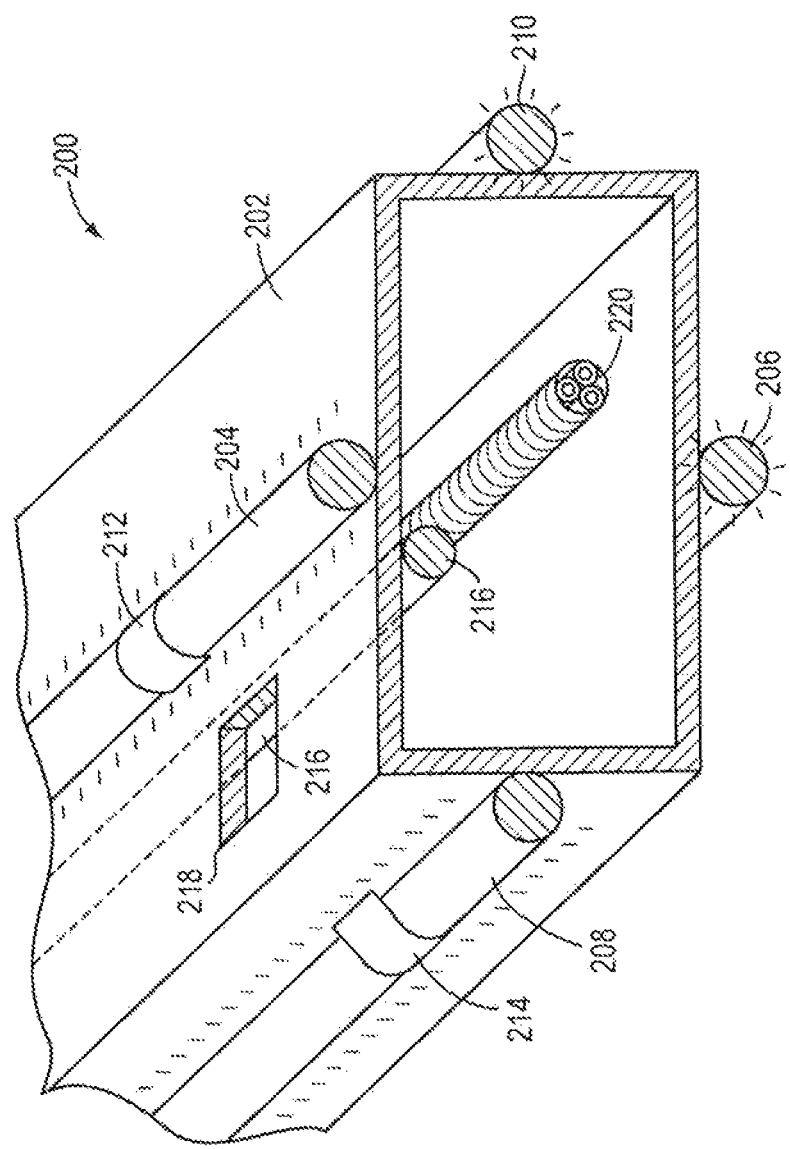
FIG. 2 is an enlarged perspective view of an illuminated track in accordance with an embodiment of the invention.

Another example of a track-lighting system 200 in accordance with the present invention is illustrated in FIG. 2. A track 202 is illuminated by a first waveguide 204 proximate its top, a second waveguide 206 proximate its bottom, a third waveguide 208 proximate its left side, and/or a fourth waveguide 210 proximate its right side. Each of the waveguides 204-210 may emit light over its entire length or may have portions 212 that do not emit light. For example, the material in the waveguides 204-210 at the non-light-emitting portions 212 may lack light-scattering particles, thus confining light within the waveguide by total internal reflection (TIR) and preventing or limiting its emission; that is, light-scattering particles are included within the length of the waveguide only where light is to be emitted. Another approach is to mechanically distort the waveguides 204-210 where light is to be emitted, thereby defeating TIR in the distorted regions. This may occur, for example, by means of the clamp that retains a track light in position along the track.

Alternatively or in addition, the track 202 may include one or more opaque patches 214 that cover portions of the waveguides 204-210, thus preventing the emission of light from those portions. In another alternative, the track 202 is substantially opaque, and light (from for example, an additional waveguide 216) from the waveguide 216 made selectively visible through one or more windows or apertures 218. In one embodiment, the light-emitting locations 112 illustrated in FIG. 1 are apertures in the waveguide 102. The track 202 may also carry power and/or control lines 220 for supplying power or for controlling one or more track lights and/or other light sources.

Figure 3:
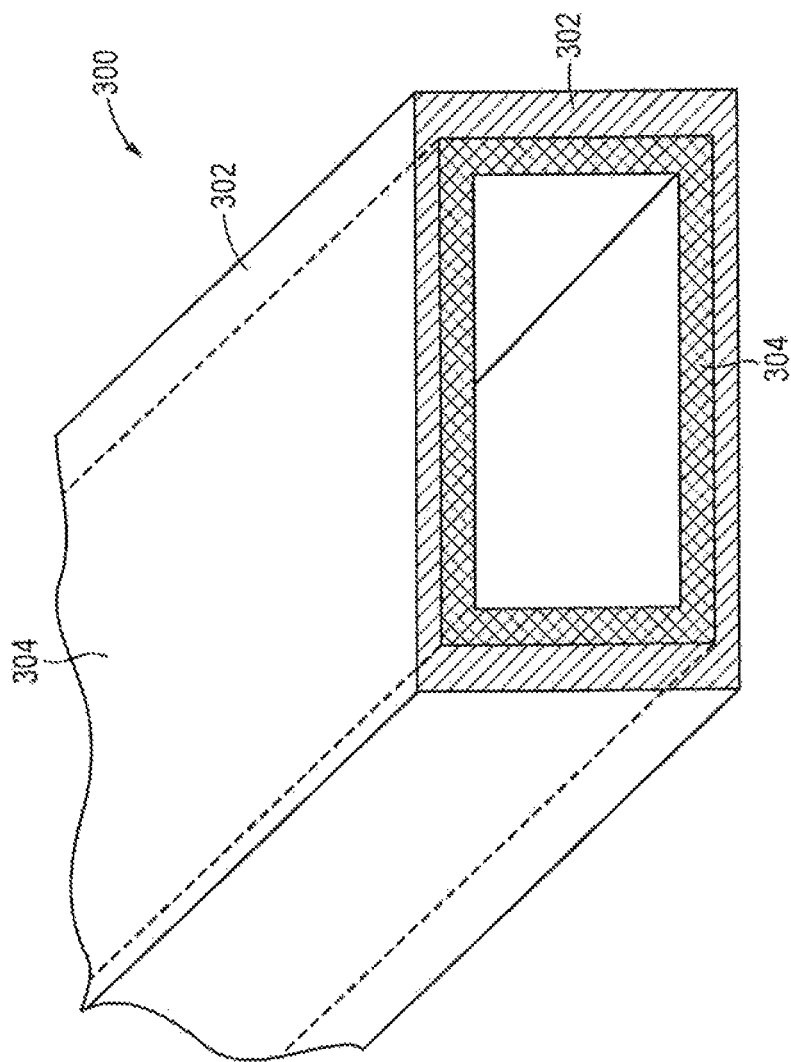
FIG. 3 is an enlarged perspective view of another illuminated track in accordance with an embodiment of the invention.

In another embodiment, as illustrated in FIG. 3, a track-lighting system 300 includes a light guide 302 that encloses a track 304. (Alternatively, the light guide 302 may only partially enclose the track 304.) Some or all of the waveguide 302 may emit light; for example, selected segments of the light guide 302 may include scattering particles that cause light to be emitted in those segments, or conversely, the light guide 302 may contain scattering particles along its entire length but be covered, along selected segments, by a light-blocking material. In still another alternative, light is generally confined within the light guide 302 by TIR, and clamping a track light over the light guide 302 distorts the light guide sufficiently to cause light emission. The light guide 302 may also carry power and, via inductive or capacitive coupling, provide power to the track heads. Alternatively, a slot or other aperture in the light guide 302 may provide for an electrical power connection to the track heads. The track 304 may be, for example, a flexible and electrically conductive metal band, and the light guide 304 may be wholly or partially covered by clear flexible plastic that allows light to be transmitted therethrough.

Figure 4:
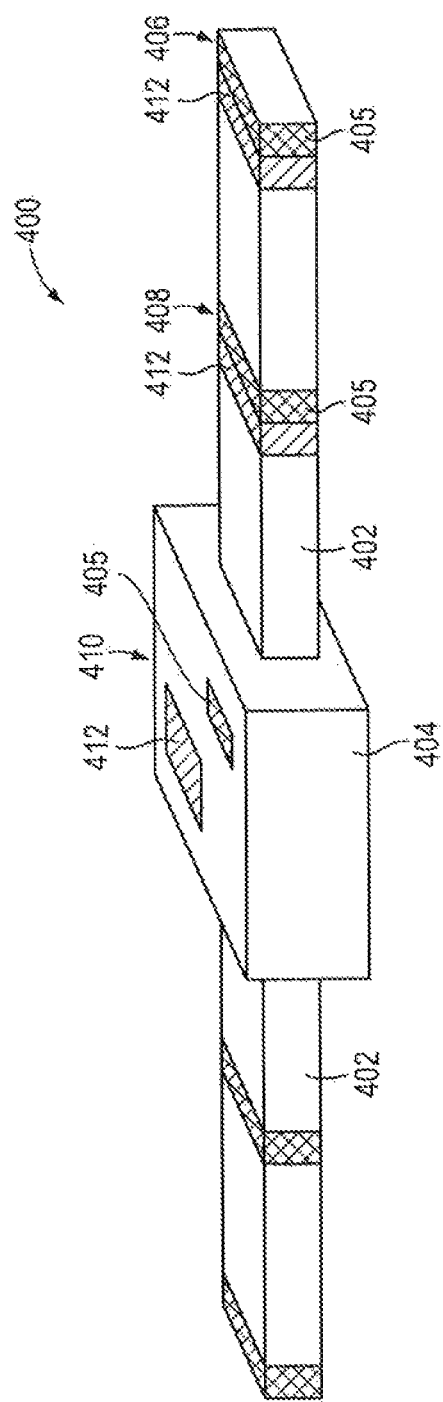
FIG. 4 is a perspective view of a track head and an illuminated track in accordance with an embodiment of the invention.

Another track-lighting system 400 that includes a track 402 and a track head 404 is illustrated in FIG. 4. A light source 405 slidably disposed on the track 402 may be releasably retained in a position 406 at the end of track 402, in a position 408 within the track 402, or in a position 410 within the track head 404, for example. The light source 405 may include one or more LED lights, and the LED lights may include LEDs of different colors, intensities, and/or color temperatures. In one embodiment, the light source 405 within the track head 404 is the light source disposed within an attached track light; the light source in this embodiment, therefore, is used to provide light both through the track light and the light guide. The light source 405 may be configured to transmit light into a light guide, such as one or more of the light guides described above with reference to FIGS. 2 and 3. As one of skill in the art will understand, an in-coupling region, lens, waveguide, or other similar structure or device may be used to couple light emitted from the light source 405 into a light guide within or on the track 402. Alternatively, the track head 404 may contain separate light sources for direct illumination and for providing light to the light guide, each of which may have different colors, color temperatures and/or spectral-power distributions. Light is selectively emitted from the light guide in any of the above-described fashions.

In one embodiment, the track-lighting system 400 includes a control circuit 412 disposed at the first position 406 the end of the track 402, at the second position 408 within the track 402, or at a third position 410 within the track head 404. (Alternatively, the system may contain a single control circuit, or multiple circuits, located remotely but with output terminals at positions 406, 408, 410.) The control circuit 412 may be used to control a property of the LED light source 405, such as its color, warmth, or intensity. For example, the control circuit 412 may be programmed to cycle the colors emitted by the light source 405 in accordance with a particular application, such as colors corresponding to the branding of a particular customer. The control circuit 412 may control multiple light sources 405, or multiple control circuits 412 may each control different light sources 405, thereby allowing for the multiple simultaneous display of lights of different colors, intensities, or color temperatures. In one embodiment, multiple light guides are used to carry and emit lights having different properties. In embodiments where the track head 404 contains different light sources for direct illumination and for injection into the light guide, these may be controlled separately and/or separately cycled pursuant to a stored program. The control circuits may receive wireless commands from a user via a hand-held radio-frequency or infrared controller, which can be used to program the control circuits or simply to change the current lighting display. Commands may also be sent through wired connections.

Figure 5:
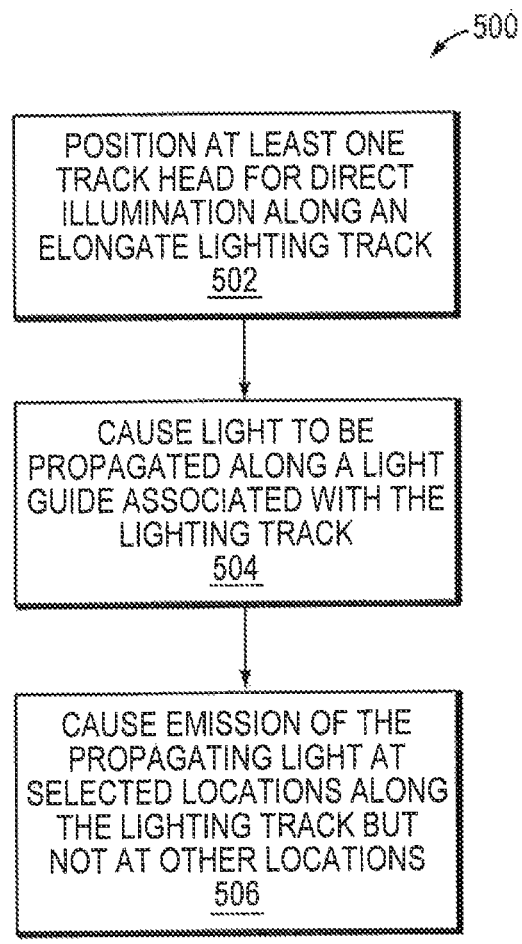
FIG. 5 is a flow chart illustrating a method for illuminating a lighting track.

FIG. 5 is a flow chart illustrating one embodiment of a method 500 for illuminating a lighting track. In a first step 502, at least one track head is positioned along an elongate lighting track; the track head is used for direct illumination (of, e.g., a room or object). In a second step 504, the light is propagated along a light guide associated with the lighting track. For example, the light may be transported by light guides 204, 206, 208, 210, 216, and/or 302, as described above. In a third step 506, the light is emitted at selected locations along the lighting track but not at other locations.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A track lighting system comprising:
a lighting track for adjustably receiving a track head providing direct illumination;
an LED light source;
a light-transmitting element associated with the lighting track, the light-transmitting element capturing light emitted by the LED light source and emitting it over at least a portion of the track,
wherein the LED is disposed in the track head or in the lighting track.

2. The system of claim 1, wherein the light-transmitting element is a light pipe.

3. The system of claim 1, wherein the light-transmitting element is disposed above, below, beside, or within the track.

4. The system of claim 1, wherein the light-transmitting element encloses the track.

5. The system of claim 1, further comprising a track head configured to attach to the lighting track.

6. The system of claim 5, wherein the LED light source is disposed within the track head.

7. The system of claim 6, wherein the LED light source provides direct illumination as well as the light captured by the light-transmitting element.

8. The system of claim 6, wherein separate LED light sources disposed within the track head provide direct illumination and the light captured by the light-transmitting element.

9. The system of claim 1, wherein the LED light source is disposed within the lighting track.

10. The system of claim 1, wherein the LED light source comprises a colored LED.

11. The system of claim 1, further comprising a control circuit for changing a property of the LED light source.

12. The system of claim 11, wherein the property is color, color temperature, or intensity.

13. The system of claim 11, wherein the control circuit is controllable via a wireless, infrared, or wired connection.

* * * * *